United States Patent [19]

Onishi

[11] 4,305,147
[45] Dec. 8, 1981

[54] TONE ARM DAMPING DEVICE
[75] Inventor: Junichi Onishi, Tokorozawa, Japan
[73] Assignee: Pioneer Electronic Corporation, Tokyo, Japan
[21] Appl. No.: 76,535
[22] Filed: Sep. 18, 1979
[30] Foreign Application Priority Data
 Sep. 19, 1978 [JP] Japan .................. 53-128515[U]
[51] Int. Cl.³ .............................................. G11B 3/18
[52] U.S. Cl. ................................................ 369/248
[58] Field of Search ...................... 274/23 R; 369/248
[56] References Cited
U.S. PATENT DOCUMENTS 3,028,161 4/1962 Siebert .............................. 274/23 R
3,297,830 1/1967 Baloghy ...................... 274/23 R X
3,647,224 3/1972 Klein ................................. 274/23 R
3,836,155 9/1974 Joannoa ............................ 274/23 R
3,963,246 6/1976 Trochimowski ................. 274/23 R
4,033,591 7/1977 Ichikawa ........................... 274/23 R
4,154,445 5/1979 Joannoa ............................ 274/23 R FOREIGN PATENT DOCUMENTS
977841 12/1964 United Kingdom ............ 274/23 R Primary Examiner—Charles E. Phillips
Attorney, Agent, or Firm—Sughrue, Mion, Zinn, Macpeak and Seas

[57] ABSTRACT

A tone arm damping device which provides damping for both horizontal and vertical vibration forces utilizing a single damping mechanism. A gimbal-type support structure includes first and second rotatable bodies rotated respectively from a fixed shaft and from each other. The second or inner rotatable body has formed therein an annular reservoir of damping fluid. A fluted damping ring, attached through an adjustment mechanism to the fixed shaft, extends into the fluid reservoir. The extent of the damping ring into the fluid and hence the amount of the damping force may be set by the adjustment mechanism.

7 Claims, 10 Drawing Figures

TONE ARM DAMPING DEVICE

BACKGROUND OF THE INVENTION

The present invention relates to an improvement in a damping mechanism for a tone arm.

To obtain good reproduction characteristics with a tone arm system, it is necessary to apply damping forces to the arm within the arm's rotary support structure in both horizontal and vertical directions to prevent resonance in either direction.

Previously, single point support-type tone arm structures have been known which by their very nature prevent multi-directional resonance from arising. However, in the case of the more preferable two point support-type tone arm, for example a gimbal-type tone arm, heretobefore independent damping mechanism had to be provided for each of the horizontal and vertical directions. As may readily be appreciated, the resulting structure was quite complex requiring many mechanical components and was correspondingly costly. Because of the complexity and the dual orientation, leakage of damping fluid was frequently a problem.

Thus, it is an object of the invention to provide a tone arm system having a damping mechanism capable of providing damping in both horizontal and vertical directions.

It is further an object of the invention to provide such a tone arm damping mechanism which is simple and inexpensive in construction and which utilizes only a single mechanism for both horizontal and vertical directions.

SUMMARY OF THE INVENTION

These, as well as other objects of the invention, are met by a tone arm damping device including a main fixed shaft secured to a base member, a first rotatable body, first rotation bearing means for rotatably supporting the first rotatable body upon the fixed shaft in a first direction, a second rotatable body having a concave annular portion which holds a damping fluid and having the tube of the tone arm secured thereto, second rotation bearing means for rotatably supporting the second rotatable body on the first rotatable body in a direction perpendicular to the first direction, and damping means fixedly secured relative to the main shaft and having portions disposed in the damping fluid to eliminate thereby resonances in both the first and second directions.

An adjusting mechanism may be provided for adjusting the amount of damping force by varying the extent of said damping means in said damping fluid. Preferably, the adjusting mechanism is so constructed as to be disengageable from the damping fluid.

The adjusting mechanism of the invention includes a damping ring, an adjustment dial and a damping force adjustment ring. The damping force adjustment ring is in turn fixable at either of first and second positions on the fixed shaft. The ring has a plurality of vertical apertures therein. The adjustment dial has a sleeve portion extending therefrom surrounding portions of the damping force adjustment ring and has plural slanted apertures therein. The damping ring includes at its lower portion plural grooves which extend into the damping fluid and has pins passing through the slanted grooves and into the vertical apertures.

DESCRIPTION OF THE PREFERRED EMBODIMENTS OF THE INVENTION

Figure 1:
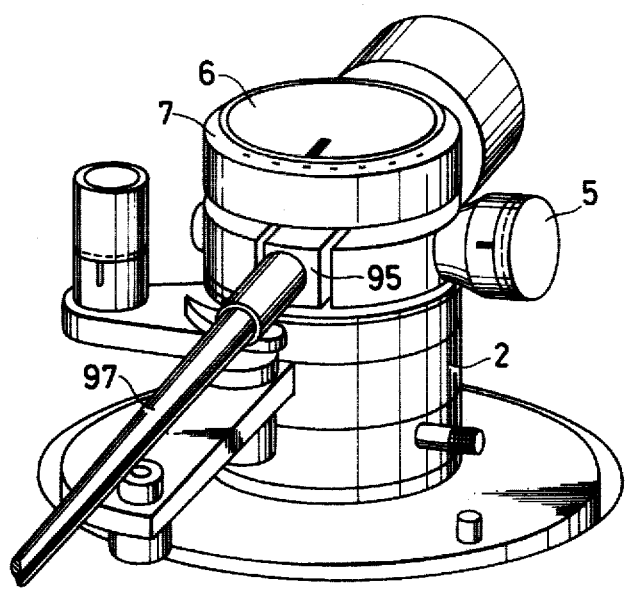
FIG. 1 is a perspective view showing the rotary support structure according to the present invention.

The present invention will be hereinafter described with reference to the accompanying drawings. Reference numeral 1 designates a fixed shaft, the main shaft, of a rotary support structure, fixedly mounted on a stand 2. A first rotatable body 3 is laterally rotatable through a bearing upon a lower portion of the shaft as shown. The above-described rotatable body 3 includes a cup-shaped concave portion. An oil sump is defined in the interior portions of second rotatable body 9. In order to mount the second rotatable body 9, including the oil sump, a pivot shaft 4 is provided on one side 32 of the first rotatable body 3 while a bearing rotatably supporting a rotary shaft 94 fixedly secured to the second rotatable body 9 forming the oil sump and extending therefrom is provided on the opposite side 33 of the second rotatable body 9 adjacent to a stylus tracking force adjustment knob 5. The structure of the stylus tracking force adjustment mechanism does not directly relate to the present invention. An explanation therefor is, therefore, omitted.

Figure 3A:
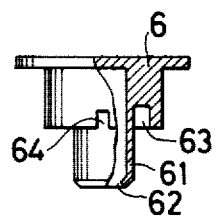
FIG. 3A is a partially cross-sectioned side view of a damping force adjustment ring according to the present invention and FIG. 3B is a bottom view thereof.
Figure 3B:
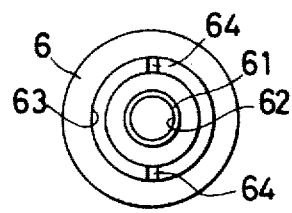

Next, a damping force adjustment ring 6 is mounted on an upper portion of the fixed shaft 1. An inwardly projecting annular portion 62 is formed inside of an extended sleeve 61 of the ring 6 so that when shaft 1 is inserted into the adjustment ring 6, the annular projecting portion 62 is intimately engaged with an annular groove 11 formed in the lower portion of the shaft 1 to positively prevent adjustment ring 6 from rotating. The above-described ring 6 may be made of synthetic resin or the like so as to be lifted along the fixed shaft when it is unnecessary to apply the damping force. The ring 6 is also engaged with a second annular groove 12 which is formed above the annular groove 11 in the fixed shaft 1. An annular space 63 is formed around an outer circumference of the sleeve 61 extending from the ring 6. This space is utilized to dispose an inner circumferential wall of the second rotatable body 9 which will be described below. Vertical grooves 64 into which damping position adjusting pins are inserted are provided in an outer circumferential wall of the annular space 63 as shown in FIGS. 3A and B.

Figure 2:
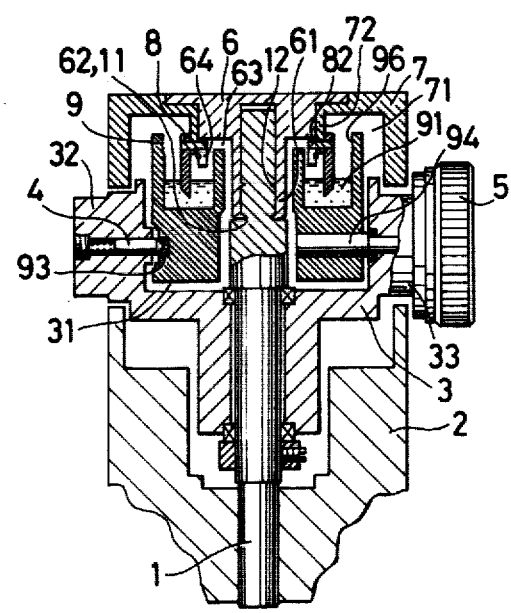
FIG. 2 is a cross-sectional view through the support structure shown in FIG. 1.
Figure 4A:
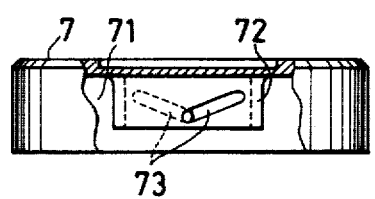
FIG. 4A is a partially cross-sectioned side view of an adjustment dial according to the present invention and FIG. 4B is a plan view thereof.
Figure 4B:
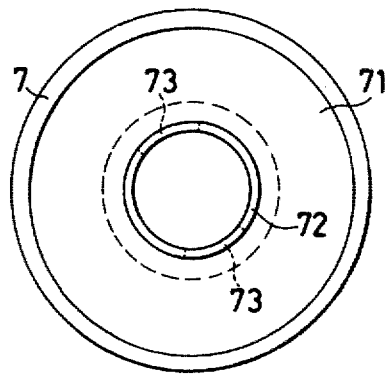

Reference numeral 7 designates an adjusting dial which is engaged with the ring 6 as shown in FIG. 2. A scale is provided along an inner circumferential periphery of a top surface thereof. The adjusting dial 7 is also provided with an interior annular space 71 and an inner circumferential wall 72 which is engaged with the outer circumferential wall of the adjusting ring 6. In the dial 7, slanted grooves 73 are formed opposite one another as shown in FIGS. 4A and 4B. Adjusting pins 82 of a damping ring, to be described below, are engaged with the slanted grooves.

Figure 5A:
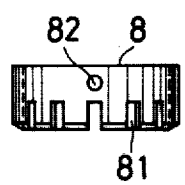
FIG. 5A is a side view of the damping ring according to the present invention and FIG. 5B is a bottom view thereof.
Figure 5B:
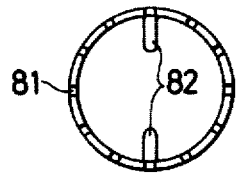
Figure 6A:
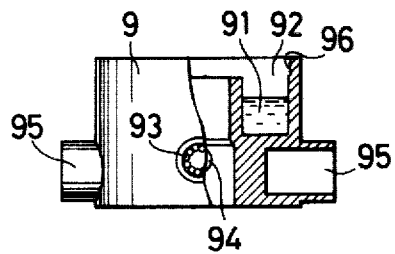
FIG. 6A is a partially cross-sectioned side view of an oil sump according to the present invention and FIG. 6B is a partially cross-sectioned plan view thereof.
Figure 6B:
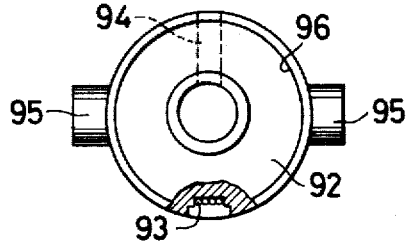

Within the above-described annular space 71 are positioned the damping ring 8 and the outer peripheral wall of the oil sump. In a lower portion of the damping ring 8, a number of cutaway grooves 81 are provided as shown in FIGS. 5A and 5B. A circumferential wall of the damping ring 8 is engaged with the outer circumferential portion of the inner wall 72 of the adjusting dial 7. The damping position adjusting pins 82 project inwardly and pass through the slanted grooves 73 into the cutaway grooves 64 of the adjusting ring 6. An annular trough 92 is formed at an upper portion of the oil sump for holding therein a material having a high viscosity resistance such as silicone oil 91. A bearing 93 is provided at a lower portion of the oil sump 9 for receiving the pivot shaft 4 which is provided in the first rotatable body 3 in order to support second rotatable body 9 and to permit it to tilt or rotate. In the opposite lower portion of the second rotatable body 9, a fixed shaft 94 is positioned which engages the bearing formed in the first revolving body. Further, in the lower portion of the oil sump, as shown in FIG. 6, mounting holes 95 are provided for receiving a tube arm 97 of the tone arm and for mounting a weight shaft, which supports a counterweight, at a position ninety degrees to the rear of the bearing 93 and the rotary shaft 94. Reference numeral 96 designates a cap screw thread to which may be attached a cap screw which may be utilized during transit to prevent the oil 91 from escaping from the oil sump.

When the adjusting dial 7 is rotated in order to increase or decrease the damping force in the vertical or horizontal direction, since the damping position adjusting pins 82 of the damping ring 8 extend into the slanted grooves 73 formed in the inner wall thereof, the pins 82 move vertically along the vertical grooves 64 due to the slanted grooves 73 to thereby vary the vertical position of the damping ring 8. Accordingly, the damping ring 8 moves upwardly or downwardly corresponding to the positional movement of the pins 82 and the extent that the lower portion of the damping ring is dipped into the silicone oil 91 is varied. The greater the portion of the damping ring dipped in the oil becomes, the greater will be the damping force. Should it be unnecessary to apply a damping force, the adjusting ring 7 may be lifted upwardly. Since the damping position adjusting pins 82 of the damping ring 8 passing through the slanted grooves 73 of the adjusting dial 7 are engaged with grooves 64 of the adjusting ring 6, the adjusting ring 6 is also moved upwardly together with the dial 7 so that the projections 62 thereof are disengaged from the first annular groove 11 of the fixed shaft 1 and are stopped when in engagement with the second annular groove 12 of the fixed shaft 1. At this time, the cutaway grooves 81 at the lower portion of the damping ring 8 shown in FIGS. 5A and 5B are moved above the silicone oil 91 and are thereby separated therefrom.

Should horizontal vibration be applied to the rotary support structure of the tone arm, the first rotatable body 3 is horizontally rotated around the rotary shaft 1 together with the oil sump formed within the second rotatable body 9, which is supported by the fixed shaft 94. The damping ring 8 does not rotate since the damping ring is dipped into the silicone oil 91 which applies a damping force in the horizontal direction.

Also, should vibration in the vertical direction be applied to the rotary support structure, only the oil sump 9 is rotated in the vertical direction around the rotary shaft formed by the pivot shaft 4 and the fixed shaft 94 thereby producing a vertical damping effect in the same manner as described above. Therefore, in the thus constructed device, even if both vertical and horizontal vibrations are simultaneously applied to the rotary support structure, both horizontal and vertical damping forces are simultaneously applied to the rotary support structure by using only a single oil sump.

What is claimed is:

1. A tone arm damping device comprising:
a main fixed shaft secured to a base member; a first rotatable body;
first rotary bearing means for rotatably supporting said first rotatable body upon said fixed shaft for rotation about a first axis;
a damping fluid;
a second rotatable body having a concave portion for receiving said damping fluid therein and said second rotatable body having a tone arm tube extending therefrom;
second rotary bearing means for rotatably supporting said second rotatable body on said first rotatable body for rotation about a second axis perpendicular to said first axis; and
damping means fixedly secured on said main shaft and having portions disposed in said damping fluid to thereby eliminate resonance in both horizontal and vertical directions.

2. A tone arm damping device as defined in claim 1, wherein said first axis is vertical and said second axis is horizontal.

3. A tone arm damping device as defined in claim 2, further comprising an adjusting mechanism for adjusting the amount of a damping force provided by the damping means and damping fluid, said mechanism being secured to the fixed shaft.

4. A tone arm damping device as defined in claim 3, wherein said adjusting mechanism is disengageable from the damping fluid.

5. A tone arm damping device as defined in claims 3 or 4, wherein said adjusting mechanism includes a damping ring, an adjustment dial and a damping force adjustment ring, said damping force adjustment ring being fixable to first and second positions on said fixed shaft and having a plurality of vertical apertures, said adjustment dial having a sleeve portion extending therefrom surrounding portions of the damping force adjustment ring and said adjustment dial having a plurality of slanted apertures therein, and said damping ring having at its lower end portion a plurality of grooves extending into said damping fluid and having pins passing through said slanted grooves and inserted into said vertical apertures whereby the damping force is adjustable by the rotation of said adjustment dial.

6. A tone arm damping device as defined in claim 2, wherein said main fixed shaft is disposed perpendicular to said base member, said first rotatable body surrounding a lower portion of said main shaft and having a cup shaped portion therein, said second rotatable body being disposed in said cup shaped portion, said damping means being mounted upon an upper portion of said main shaft.

7. A tone arm damping device as defined in claim 6, further comprising an adjusting mechanism for adjusting the amount of damping force provided by the damping means and damping fluid, said mechanism being secured to said fixed shaft.

* * * * *